United States Patent [19]

Miller

[11] Patent Number: 5,407,543

[45] Date of Patent: Apr. 18, 1995

[54] PROCESS FOR REHABILITATING INTERNALLY REINFORCED CONCRETE BY ELECTRICAL TREATMENT

[76] Inventor: John B. Miller, Bergtunvn 9B, 1087 Oslo 10, Norway

[21] Appl. No.: 203,503

[22] Filed: Feb. 28, 1994

Related U.S. Application Data

[60] Continuation of Ser. No. 875,456, Apr. 29, 1992, abandoned, which is a division of Ser. No. 539,069, Jun. 15, 1990, Pat. No. 5,228,959, which is a division of Ser. No. 366,204, Jun. 9, 1989, Pat. No. 5,198,082, which is a continuation-in-part of Ser. No. 352,266, May 16, 1989, abandoned, which is a continuation-in-part of Ser. No. 100,834, Sep. 25, 1987, Pat. No. 4,832,803.

[51] Int. Cl.$^6$ ............................................. C25F 7/00
[52] U.S. Cl. .................................... 204/130; 204/147; 204/196
[58] Field of Search ............... 204/130, 147, 148, 196, 204/197, 94, 128, 284, 414

[56] References Cited

U.S. PATENT DOCUMENTS

| | | | |
|---|---|---|---|
| 756,328 | 4/1904 | Christy | 204/284 |
| 4,812,212 | 3/1989 | Dimond et al. | 204/196 |
| 4,832,803 | 5/1989 | Vennesland et al. | 204/130 |
| 4,865,702 | 9/1989 | Miller et al. | 204/147 |
| 4,990,231 | 2/1991 | Stewart et al. | 204/196 |

OTHER PUBLICATIONS

Slater et al, "Electrochemical Removal of Chloride from Concrete Bridge Decks", Material Performance, Nov. 1976, pp. 21–26.

Lankard et al, "Neutralization of Chloride in Concrete", Federal Highway Administration Report No. FHWA-RD-76-60, Sep., 1975, pp. 46 and 96.

Poulsen, "Re-Alkalisation of Carbonated Concrete Facades by Electro-Osmosis", Dansk Beton, nr 4, Jun. 12, 1988, pp. 20, 21, 23, 25.

Primary Examiner—T. Tung
Attorney, Agent, or Firm—Schweitzer Cornman & Gross

[57] ABSTRACT

A process for rehabilitation of internally reinforced concrete which comprises applying to surface areas of the concrete a temporary sprayed-on layer of a self-adherent, electrolytic material comprised of cellulosic pulp fiber mixed with liquid electrolyte. A distributed electrode means, preferably a wire grid, is embedded between layers of the self-adherent coating, and preferably is supported by spaced-apart, non-conductive battens. Voltage sufficient to develop a current of about 1–5 amps/m$^2$ is applied between the reinforcement and the distributed electrode, to cause migration of chloride ions from the concrete into the electrolytic coating. When the chloride content of the concrete has been reduced to a desired level, the voltage is discontinued and the adherent electrolytic coating and distributed electrode are removed. Preferred electrolytes include water or other solutions, such as calcium hydroxide. Desirably, the distributed electrode is formed of a ferrous material reactive with chlorine, to minimize the release of free chlorine gas into the ambient.

8 Claims, 1 Drawing Sheet

PROCESS FOR REHABILITATING INTERNALLY REINFORCED CONCRETE BY ELECTRICAL TREATMENT

RELATE APPLICATIONS

The present application is a continuation of my prior application Ser. No. 875,456, filed Apr. 29, 1992, now abandoned. Application Ser. No. 875,456 was a division of my prior application Ser. No. 539,069, filed Jun. 15, 1990, now U.S. Pat. No. 5,228,959, granted Jul. 20, 1993, which in turn was a division of application Ser. No. 366,204, filed Jun. 9, 1989, now U.S. Pat. No. 5,198,082, granted , Mar. 30, 1993, which in turn was a continuation-in-part of application Ser. No. 352,266, filed May 16, 1989, now abandoned. Application Ser. No. 352,266 was a continuation-in-part of application Ser. No. 100,834, filed Sep. 25, 1987, now U.S. Pat. No. 4,832,803, granted May 23, 1989.

BACKGROUND AND SUMMARY OF INVENTION

The present invention is directed to a method for rehabilitating internally reinforced concrete by removal of chlorides.

One of the serious problems in connection with the maintenance of reinforced concrete is the matter of corrosion of the internal reinforcement. In many cases corrosion of the reinforcement is caused by the chloride contamination. This may result from the gradual absorption of chlorides over a period of time or, in some cases, from the incorporation of chlorides into the original concrete to accelerate setting. Conventional techniques for repairing chloride-contaminated concrete involve physical removal of the contaminated material and replacement with fresh concrete. This is obviously a costly and disruptive solution, at least with respect to vertical and overhead surfaces.

It has been proposed heretofore to employ electrolytic techniques for removing chlorides by ion migration. An article by J. E. Slater, *Materials Performance*, 1976, pp 21–26, describes such a method, which involves applying an electric potential between internal reinforcement and a surface electrode submerged within a liquid electrolyte contained on the surface of the concrete. With the surface electrode forming the positive pole of the electric field, the negative chloride ions within the concrete are caused to migrate through the concrete and out into the electrolyte where they are oxidized to chlorine gas on the positive electrode or react chemically with components in the electrolyte.

The experiments described in the Slater article were carried out on chloride contaminated bridge decks, where the reinforcement had corroded. The bridge deck area was divided into sections of about 3.5 m$^2$ that were individually treated. These sections were provided with sealed dams for containing a liquid electrolyte solution. The electrolyte used was a calcium hydroxide solution, with and without ion exchangers. Slater used voltages of between 100 and 120 V, and the current varied between 28 and 100 amps per section. Slater was able to remove up to 90% of the chlorides in the concrete within a 24 hour period. Where the electrolyte was used without ion exchangers, chlorine gas developed on the platinized titanium electrodes and was released as free chlorine gas.

The Slater technique has not been commercially successful, for several reasons: For one, the safety considerations are substantial when operating at voltages as suggested by Slater. More importantly, the Slater procedure is useful only for removing chlorides from the upper surface of a horizontal slab. However, the more conventional method of removing the concrete is relatively simple and inexpensive when dealing with an upwardly facing horizontal slab. The Slater method may well be more costly than conventional techniques.

The present invention provides an economical electrolytic method of removing chlorides from contaminated reinforced concrete that can be carried out safely and with reasonable energy requirements and which, importantly, can be utilized conveniently and economically on vertical and downwardly facing surfaces. In U.S. Pat. Nos. 4,832,803 and 5,198,082 (Ser. No. 366,204), mentioned above, it is proposed, generally, to employ removable, cohesive, self-adherent materials as electrolytic media in electrolytic chloride removal procedures. A distributed electrode means is embedded within the adherent coating and forms the positive terminal of the electrical system. When the process has been completed, that is, when the level of chloride contamination has been reduced to a desired level, both the adherent coating and the electrode means are removed from the face of the concrete. In this respect the process of the invention differs markedly from cathodic protection systems, for example, where systems are permanently installed for continuously maintaining an electric potential between internal reinforcement and surface electrode means.

In the above-mentioned U.S. Pat. No. 4,832,803, a material such as retarded gunite is disclosed as one of the materials suitable for use as an adherent electrolyte coating having adequate conductivity and being removable upon completion of the procedure. In an especially advantageous and still further improved procedure according to the present invention, the adherent electrolytic coating material is formed of a mixture of cellulosic pulp fiber and water or other solution, which is self-adherent to the surface of the concrete. The pulp fiber, which is advantageously derived from re-cycled newsprint, is mixed with the liquid solution at the outlet of a spray nozzle, and the fiber-liquid pre-mix is sprayed onto the surface of area to be treated. The surface of the concrete draws some of the solution from the sprayed mixture and causes the mixture to adhere tenaciously to the concrete surface.

Pursuant to the invention, the concrete area to be treated is tested by the taking of cores and testing for chloride content. From these initial tests, the approximate time required to achieve a desired level of chloride reduction can be estimated. The treatment can be continued until approximately the estimated time has passed, after which a further set of cores may be taken to establish the final processing conditions.

For a more complete understanding of the features and advantages of the invention, reference should be made to the following description of preferred embodiments and to the accompanying drawing.

DESCRIPTION OF A PREFERRED EMBODIMENT OF THE INVENTION

Figure 1:
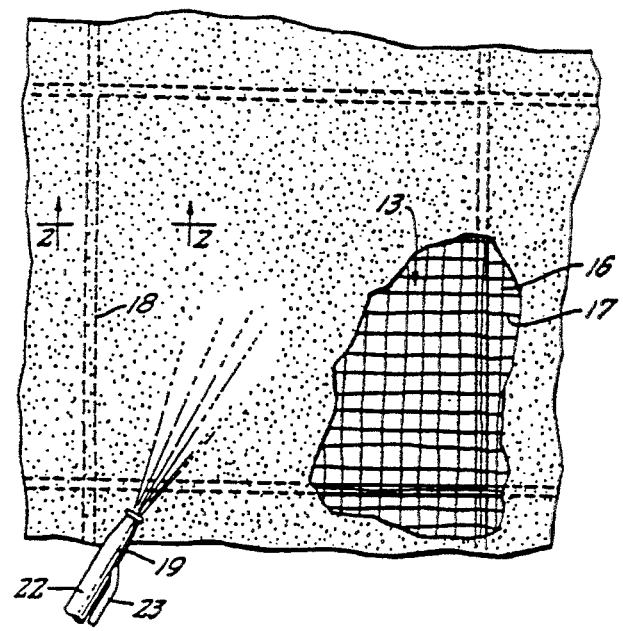
FIG. 1 is a fragmentary elevational view of a concrete wall being prepared for treatment according to the invention, with parts broken away to show certain additional details.
Figure 2:
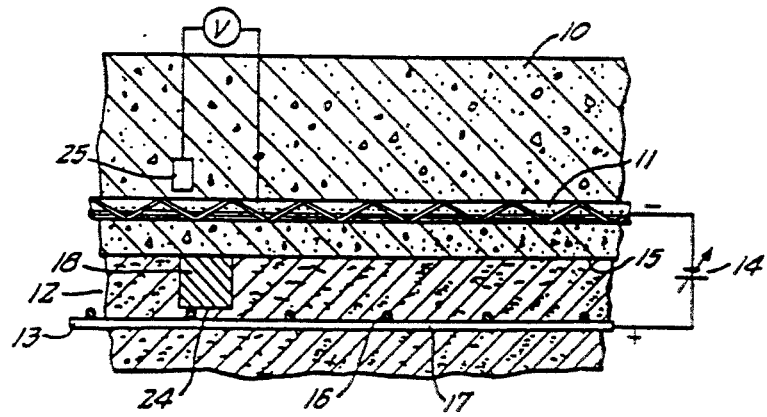
FIG. 2 is an enlarged fragmentary cross sectional view as taken generally on line 2—2 of FIG. 1.

Referring now to the drawing, the reference numeral 10 designates in a general way a body of a steel-reinforced concrete structure, which may be in the form of a vertical wall or overhead structure. The concrete wall typically includes a series of embedded steel reinforcing bars 11 of conventional type.

Pursuant to the teachings of our parent application, a concrete structure 10, 11 that has become contaminated with chlorides, can be rehabilitated by applying an adherent electrolytic coating 12 to one surface of the structure, preferably that which has become most contaminated. A temporary distributed electrode 13, advantageously in the form of a grid-like structure of conductive wire, is embedded within the electrolytic coating 12. A source 14 of direct current voltage is connected between the internal reinforcing bars 11 and the temporary electrode structure 13. Over a period of time, an electrolytic migration of chloride ions from the internal regions of the concrete wall, adjacent to the reinforcing bar 11 and into the electrolytic medium 12, is effected by the electric field. In accordance with broader aspects of the invention, after a predetermined period of treatment, wherein the chloride content of the concrete has been sufficiently reduced, the voltage source 14 is disconnected, the electrode 13 and electrolytic medium are removed, and, typically, the outer surface 15 is coated with a sealant layer (not shown) to inhibit future infusions with chloride-containing compositions.

Significantly, the external electrode means 13 is of a distributed nature. Most advantageously, this can be realized by utilizing a grid-like structure consisting of a first set of wires 16 arranged at right angle to a second set of wires 17, with the wires being spot welded or otherwise joined at the intersecting points. A particularly advantageous form of electrode structure 16 is comprised of a grid of wire 16, 17, as illustrated, where the wires are approximately six mm in diameter and are constructed to form a grid with openings of about 10–15 cm on a side. The specific form of electrode structure can be varied significantly, of course, as long as the electrode structure is distributed relatively uniformly throughout the entire surface area being treated.

In many electrolytic systems for the treatment of concrete, such as cathodic protection systems, for example, or the system of the Slater article heretofore mentioned, the external electrode system is formed of a material such as platinized titanium, which is non-reactive to the migrating chloride ions. In appropriate circumstances, the distributed electrode used in the process of the invention may be formed of similar materials. Such materials have a disadvantage, however, of releasing free chlorine gas to the surrounding ambient, unless some kind of ion exchange material is utilized. As will be understood, the release of chlorine gas can pose safety hazards, unless ventilation is adequate. The utilization of ion exchange materials, on the other hand, involves added expense.

In a preferred practice of the invention, the external electrode 13 is formed of steel. During operation of the process, the free chlorine ions react with the steel, causing the steel to corrode. This substantially minimizes any release of free chlorine gas. Over a period of time, the corrosion products will reduce the cross section of the individual wires, and it typically will become necessary to increase voltage somewhat to maintain desired current flow densities. In certain cases, where the chloride contamination problem is particularly severe, the formation of corrosion products may actually cause discontinuities in the distributed electrode structure, in which case the electrode 13 should be replaced.

In a particularly advantageous practice of the invention, the wire grid electrode 13 is supported spaced slightly away from the front face 15 of the concrete structure, by means of battens 18, typically in the form of wooden strips about 2cm on a side. As shown in FIG. 1, the battens 18 may be attached to the face of the structure in the form of a large grid which may, for example, be about two meters on a side. The distributed electrode structure 13 is then secured to the battens 18, by stapling or other suitable means, so that the external electrode is supported in appropriately spaced relation to the surface 15 of the concrete structure.

The electrolytic medium 12 may, in principle, be formed of any self-adherent material capable of retaining moisture and, in such condition, having an adequate level of conductivity. As described in the parent application, this may include certain forms of grout, retarded so as to not set up during the course of the treatment. More advantageously, however, the electrolytic medium comprises a papier-maché-like cellulosic material formed of a mixture of cellulosic pulp in water or other solution, such as calcium hydroxide solution. The procedure advantageously utilizes a conventional form of paper-making pulp, preferably but not necessarily formed of a recycled paper. The cellulosic pulp material is applied to the surface of the concrete structure by being mixed with the solution in a mixing nozzle 19 and being sprayed upon the surface of the concrete structure as the mixed materials emerge from the nozzle 19.

Desirably, the concrete structure is prepared for the application of the cellulosic medium by initially being tested for humidity level, and adjusted if necessary. This can be accomplished by forming a recess in the concrete in a suitable location and then sealing off the outlet of the recess long enough for the relative humidity level of the air in the recess to stabilize. The relative humidity of this air is then measured by conventional instrumentation. If the relative humidity level is 90% or less, it is desirable to spray the outer surface of the concrete structure with water to the point of saturation. After a short period of surface drying, the mixture of cellulose pulp and water or other solution is sprayed over the surface of the moist concrete. Because of the porous character of the concrete, the cellulosic pulp-water or pulp-solution mixture adheres strongly to the surface 15, because of the tendency for the liquid of the pulp mixture to be drawn into the pores of the concrete.

Desirably, the pulp-solution mixture is comprised of chopped pulp mixed uniformly with the solution in ratios of from about 2.7-1 to about 4.0-1 of water or other solution per/kg of dry fiber. The two materials are joined at mixing nozzle 19, which is supplied with the pulp fiber entrained in air through an inlet tube 22, where it is joined with the liquid component, supplied through a tube 23. The pulp-solution mixture quickly sets up in the form of a papier-maché-like material, which is self-adherent to the concrete and has a high degree of coherency with itself. Advantageously, a first layer of the papier-maché-like material is sprayed onto the concrete surface to a depth approximately equal to the thickness of the wood battens 18 (e.g., about 2 cm). After this first layer has been applied, the distributed electrode grid 13 is attached to the exposed surfaces 24 of the battens, overlying the just-applied layer of the papier-maché. Thereafter, additional pulp-solution mixture is sprayed over the top of the distributed grid structure, to provide a total layer of approximately 4–5 cm in thickness.

The papier-maché-like material forming the electrolytic medium 12, because of its contained moisture content, has a sufficiently high degree of conductivity to enable the process to be carried out advantageously. Thus, the voltage source 14 may be connected to the system as soon as the pulp-liquid material has been applied in the manner described. Of course, it is necessary to maintain a certain level of moisture in the papier-maché-like medium 12, and this is accomplished by spraying the surface of the electrolytic medium 12 as often as necessary. Usually, twice per day is adequate.

Pursuant to the invention, the voltage 14 is maintained until the chloride level within the concrete structure has been reduced to an acceptable level. Normally, core samples are taken at selected points before commencement of the procedure and, from the chloride content as measured from these initial core samples, the approximate required duration of the rehabilitation procedure may be estimated. As that estimated period approaches, a further set of core samples may be taken, if desired, in order to establish with a higher degree of accuracy the remaining treatment required to bring the chloride level of concrete down to a predetermined, satisfactory level.

In a typical case, the voltage applied by the voltage source 14 is adjusted as necessary to maintain a current flow density between the internal and external electrode systems of approximately one-five amp/m$^2$ of concrete surface. Usually, however, voltages are in all events maintained at 40 volts or below for safety considerations.

As set forth in my co-pending application Ser. No. 539,069, provision can be made for monitoring the condition of the reinforcing steel to avoid its polarization over time. Especially where the reinforcing steel is maintained under tension, for example, in certain types of post-tensioned or pre-tensioned concrete structures, it would not normally be considered to utilize a procedure, such as described hereinabove, for removal of chlorides, because of the danger of hydrogen embrittlement of the steel in tension. Thus, as the process continues, the reinforcing steel gradually becomes polarized. When the polarization reaches a critical level, which may occur within a couple of weeks time in a typical process, evolution of hydrogen is favored, and steel which is in tension may become subject to hydrogen embrittlement. Such conditions obviously would be highly detrimental to a tensioned structure.

Desirably the condition of the internal reinforcing steel is monitored periodically. When the polarization reaches a danger level, the procedure can be discontinued long enough for the polarization to dissipate or the current flow may be reversed for a short period of time in order to dissipate the polarization at an accelerated rate.

To advantage, monitoring of the polarization is accomplished by the use of a reference half cell 25, which is embedded in the concrete, closely adjacent the reinforcing bar. When the voltage developed between the reinforcing bar and the reference half cell (hereinafter referred to as reference voltage) reaches a predetermined level, indicating a critical degree of polarization, the desired process modifications (e.g., voltage interruption or voltage reversal) may be carried out. By way of example, where the reference half cell 25 is a copper-copper sulphate cell, a voltage of minus 1000 millivolts would reflect the approach of a dangerous condition, at which the process should be temporarily stopped or the current reversed for a short period. Where the reference half cell 25 is a lead-lead oxide cell, a measurement of minus 500 millivolts would reflect a danger level.

In order to measure accurately the reference voltage between the reinforcing bar 11 and the reference half cell 25, as by the voltage meter V, it is necessary to interrupt the application of primary treatment voltage from the external source 14 at periodic intervals, for example every ten minutes or so. As reflected in FIG. 3, when the external voltage is interrupted, the reference voltage dissipates along a curve 30, rapidly at first and then more slowly as it approaches a limit condition representing the true reference voltage. After an interruption of five to ten seconds, the curve begins to flatten out and it becomes evident to the observer whether the reference voltage is going to reach a predetermined voltage level 31, the value of which is a function of the composition of the reference half cell.

Figure 3:
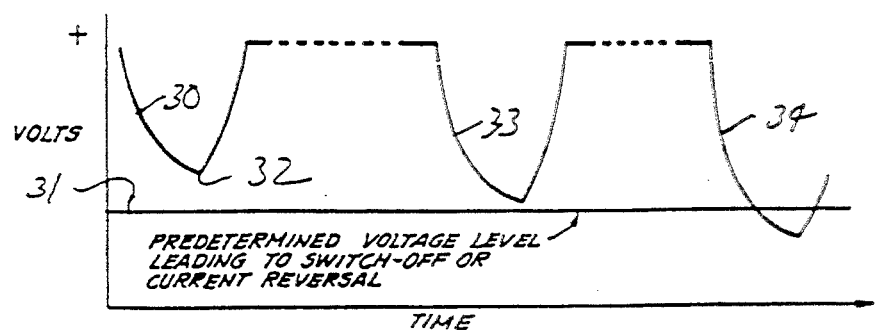
FIG. 3 is a simplified representation of a typical voltage-versus-time curve of a reference voltage monitored to determine the condition of the reinforcing steel of the concrete under treatment.

In the illustration of FIG. 3, three interruption cycles are illustrated. In the first, at the end of the interruption period, the reference voltage is at a level indicated by the reference numeral 32, which is comfortably above the predetermined danger level. Accordingly, the external voltage from the source 14 is reinitiated. In the second illustrated interruption cycle, approximately ten minutes later, the reference voltage decay curve 33 approaches but still does not reach the danger level 31, and the external voltage is reestablished for a further cycle. At the end of the third illustrated cycle, the curve 34 of the voltage decay is shown to pass below the line known to indicate a dangerous condition of the internal steel. At this time, the external voltage would either be discontinued for a sufficient period of time to allow polarization of the steel to be dissipated, or the external voltage might be applied in the reverse direction for a short period of time.

As will be readily appreciated, the procedure is readily subject to wholly automatic control through simple microprocessor circuitry, for example, designed to interrupt the external voltage on a predetermined periodical basis and to monitor the decay curve of the reference voltage.

Where desired, of course, the half cell monitor may be utilized in connection with any internally reinforced structure, whether or not the internal reinforcement is under tension. However, the use of such controls is considered highly significant in connection with tensioned reinforcement.

The procedure of the invention provides a particularly advantageous and efficacious method of removing excess chlorides from concrete structures in a substantially non-invasive manner. The use of a self-adherent, removable material as an electrolytic surface medium enables an electrolytic technique to be carried on vertical surfaces as well as downwardly facing overhead surfaces. The self-adherent medium remains sufficiently moist to provide for adequate levels of conductivity, while at the same time remaining adherent and cohesive during use and easily removable at the end of the procedure.

In accordance with the present invention and to particular and special advantage, the electrolytic medium is comprised of a papier-maché-like material formed of cellulosic pulp, which typically may be newspaper grade pulp comprised of chopped pulp fiber. The pulp fiber may be virgin, but for cost purposes is more desirably a recycled newsprint. The pulp material is mixed in situ with the liquid and sprayed on a concrete surface, prepared by being moistened to a level of at least about 90% relative humidity. The papier-maché-like material, applied in situ, has important advantages to the process, because of its high degree of self-adherence to the concrete surface, which enables it to be easily utilized on vertical and/or overhead surfaces. Likewise, the material is inherently light in weight, which also facilitates its use on vertical and overhead surfaces as will be readily appreciated. Application of the papier-maché-like electrolytic medium to the surface of the concrete is simple and inexpensive, being carried out by means of a spray nozzle which serves to both mix and apply the material. Because of the inherent light-weight character of the papier-maché material, it is typically desirable, when using such material, to separately support the external electrode grid, and this typically is done by means of battens of wood or other relatively non-conductive material.

The papier-maché-like material used for the electrolytic medium is easy to maintain. It may be remoistened easily by simply spraying periodically with additional water or other solution. It is also very durable, in that it can easily be kept in place for the duration of-the treatment period required, typically two to eight weeks. Additionally, and of particular importance, the papier-maché-like material may be readily cleaned off at the end of the treatment, using high pressure sprays, for example, Disposal of the used material is very simple and relatively inexpensive.

For most purposes, the process of the invention advantageously utilizes an external grid electrode formed of steel, which is embedded in the adherent electrolytic medium. Utilizing a steel electrode grid, the chloride ions freed from the concrete and migrating into the electrolytic medium cause the steel to corrode, thereby producing corrosion products with the steel, rather than to emit free chlorine gas. For many situations, the release of substantial amounts of free chlorine gas could not be tolerated for safety reasons. The use of a steel electrode grid, while it causes the electrode to be consumed by the corrosion products, is a superior solution to providing for ion exchange, for example. In most cases, the development of the corrosion products can be compensated for by increasing voltage levels (up to the maximum desired level of 40 volts). In particularly aggravated cases, the electrode grid may have to be replaced after a period of time, before the process has been completed. While the process of the invention does not preclude the use of more conventional electrode materials, such as platinized titanium, the use of steel electrodes is preferred and advantageous for most circumstances.

In any of its various modifications, the process of the invention may advantageously utilize monitoring of the polarization of the internal steel reinforcement as a significant control criterion. In this respect, because of a danger of hydrogen embrittlement, it would not have been considered feasible, heretofore, to utilize a process such as the described electrolytic procedure for chloride removal, in situations where the internal steel reinforcement was maintained under tension, particularly in the case of pre-tensioned or post-tensioned structures. In one of its aspects, the procedure of the invention, incorporates monitoring the condition of polarization through means such as the use of an embedded reference half cell. As polarization of the internal reinforcement increases, with continued practice of the process of the invention, the polarization is periodically monitored. When it reaches a level at which evolution of hydrogen gas is favored, and therefore hydrogen embrittlement of the steel in tension is likely to occur, the process is either terminated for a period of time or the polarity of the impressed voltage is reversed for a short period, to effect dissipation of the condition of polarization. By this means, the process may be safely practiced in conjunction with tensioned structures.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In the process for rehabilitating internally reinforced concrete, and which comprises
    (a) applying a removable adherent coating to a surface area of said concrete,
    (b) embedding in said adherent coating a distributed electrode structure,
    (c) impressing a DC voltage between said electrode structure and said internal reinforcement, and
    (d) thereafter removing and disposing of said adherent material, the improvement characterized by
    (e) forming said adherent coating by premixing a fibrous cellulosic pulp with liquid to form an electrolytic material which is strongly self-adherent to moist concrete,
    (b) spraying onto an exterior surface of said concrete a temporary coating of said self-adherent fibrous pulp material to form a light-weight, cohesive, durable and re-wettable papier-maché coating,
    (e) adjusting said DC voltage from time to time, as necessary, to maintain a current flow of from about 1 amp/m$^2$ to about 5 amp/m$^2$ of concrete surface, and
    (f) re-moistening said self-adherent fibrous pulp material a plurality of times to maintain electroconductivity throughout said rehabilitating process.
2. A process according to claim 1 wherein,
    (a) spaced battens of non-conductive material are applied to said exterior surface,
    (b) a first layer of said self-adherent pulp material is applied to said exterior surface to form a first portion of said temporary coating,
    (c) thereafter said electrode structure is installed externally of said battens and of said first layer, and
    (d) thereafter a second layer of said self-adherent pulp material is applied over said electrode structure, to form a second portion of said temporary coating.
3. A process according to claim 1 wherein,
    (a) said pulp is formed substantially of recycled newsprint.
4. A process according to claim 1 wherein,
    (a) said concrete, if wetted prior to spraying of said pulp material, is allowed to become free of surface water prior to spraying thereon of said self-adherent coating.

5. A process according to claim 1 wherein,
(a) said concrete is contaminated with chlorides,
(b) said electrode structure is formed of ferrous material to readily react with free chlorine released during said process and thereby minimize the release of chlorine gas.

6. A process according to claim 5 wherein,
(a) said electrode structure comprises a mesh material formed of wire in the range of about 4 mm to about 8 mm in diameter and having a grid structure forming openings of from about 10 cm to about 15 cm on a side.

7. A process according to claim 1 wherein,
(a) said voltage is limited to a value not greater than about 40 volts, notwithstanding that the current flow may fall below the desired range.

8. A process according to claim 1 wherein,
(a) said pulp fiber is premixed with liquid in approximate amounts of from about 2.7–4.0 liter of liquid per kg of dry fiber.

* * * * *